US008788463B2

(12) United States Patent
Friesenhahn et al.

(10) Patent No.: US 8,788,463 B2
(45) Date of Patent: Jul. 22, 2014

(54) FLEXIBLE ELECTRONIC RECORDS MANAGEMENT

(75) Inventors: Dustin Friesenhahn, Bellevue, WA (US); Sterling J. Crockett, Bothell, WA (US); John D. Fan, Duvall, WA (US); Adam Harmetz, Kirkland, WA (US); Savitha Krishnamoorthy, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 973 days.

(21) Appl. No.: 12/240,311

(22) Filed: Sep. 29, 2008

(65) Prior Publication Data

US 2010/0082548 A1    Apr. 1, 2010

(51) Int. Cl.
*G06F 17/30*        (2006.01)
*G06F 3/00*         (2006.01)

(52) U.S. Cl.
CPC .............................. *G06F 17/30085* (2013.01)
USPC ............................................. 707/662; 710/5

(58) Field of Classification Search
None
See application file for complete search history.

(56) References Cited

U.S. PATENT DOCUMENTS

| | | | |
|---|---|---|---|
| 5,813,009 A | 9/1998 | Johnson | 707/100 |
| 6,044,373 A | 3/2000 | Gladney | 707/10 |
| 2004/0215643 A1* | 10/2004 | Brechner et al. | 707/100 |
| 2005/0223414 A1* | 10/2005 | Kenrich et al. | 726/27 |
| 2006/0066902 A1 | 3/2006 | Matsui | 358/1.16 |
| 2006/0069690 A1* | 3/2006 | Patel et al. | 707/100 |
| 2006/0179061 A1* | 8/2006 | D'Souza et al. | 707/10 |
| 2006/0218198 A1* | 9/2006 | Brown et al. | 707/200 |
| 2006/0230076 A1* | 10/2006 | Gounares et al. | 707/200 |
| 2007/0088585 A1 | 4/2007 | Maguire | 705/7 |
| 2007/0094311 A1 | 4/2007 | Pelletier | 707/204 |
| 2007/0143756 A1* | 6/2007 | Gokhale | 718/100 |
| 2007/0179945 A1* | 8/2007 | Marston et al. | 707/5 |
| 2008/0086506 A1 | 4/2008 | DeBie | 707/104.1 |
| 2008/0104118 A1* | 5/2008 | Pulfer et al. | 707/104.1 |
| 2008/0154969 A1* | 6/2008 | DeBie | 707/200 |
| 2008/0229037 A1* | 9/2008 | Bunte et al. | 711/162 |
| 2011/0047132 A1* | 2/2011 | Kilday et al. | 707/694 |

OTHER PUBLICATIONS 80-20 Software, "80-20 Document and Records Management Solution," 1997-2008, 80-20 Software Pty, Ltd., http://www.80-20.com/products/document_records_management.asp.
Gladney, H.M., "A Storage Subsystem for Image and Records Management," IBM Systems Journal—vol. 32—No. 3, 1993, pp. 512-540, http://www.research.ibm.com/journal/sj323/ibmsj3203I.pdf.

(Continued)

*Primary Examiner* — Tarek Chbouki
(74) *Attorney, Agent, or Firm* — Tom Wong; Jim Ross; Micky Minhas

(57) ABSTRACT

This disclosure describes techniques of managing electronic documents as electronic records that do not require moving the electronic documents to a different repository. As described herein, an electronic document is stored at a first repository prior to a time when the electronic document is declared to be an electronic record. An administrator is able to configure a document management system (DMS) to manage the electronic document as an electronic record after the electronic document is declared to be an electronic record. In addition, the administrator is able to configure the DMS to store a copy of the electronic document at a second repository after the electronic document is declared to be an electronic record and to manage the copy of the electronic document as an electronic record.

18 Claims, 8 Drawing Sheets

(56) References Cited

OTHER PUBLICATIONS

SAP Records Management, "Records Management—Main Process," accessed Jun. 30, 2008, 3 pages; http://www50.sap.com/businessmaps/0531547C7FE54C6A9E9B5850836F5E43.htm.

TRIM Context 6, "Records Management—Records Management," 2007, Tower Software, http://www.towersoft.com/emea/Product/Records+Management/Records+Management.

* cited by examiner

FLEXIBLE ELECTRONIC RECORDS MANAGEMENT

BACKGROUND

Today's enterprises and governments generate an enormous number of electronic documents every day. For example, employees of a government agency may draft thousands of internal memoranda in a single day. Many of these electronic documents are only used for a short period of time and may be discarded or edited freely. For example, an employee of a business may write a draft sales report that is not subsequently used. Documents that may be freely discarded or edited are termed "ephemeral documents." In contrast, other electronic documents should be preserved for later reference. For example, an enterprise may wish to maintain electronic copies of contract documents for several years. Electronic documents that are preserved for later reference are referred to as "electronic records." In many circumstances, an electronic document may initially be an ephemeral document, but may later be declared to be an electronic record.

When an electronic document is declared to be an electronic record, the behavior of the electronic document changes. For example, after an electronic document is declared to be an electronic record, the electronic document may not be edited or deleted by particular users. In another example, after an electronic document is declared to be an electronic record, the electronic document may not be accessed without special permission.

An organization may use a document management system (DMS) to manage its electronic documents. A DMS is a computer system used to manage electronic documents. For instance, a DMS may be configured to track and store electronic documents. In another instance, a DMS may be used to implement document retention policies for electronic documents, including ephemeral documents and electronic records. A document retention policy of a document is a policy that governs the retention of the document. Organizations may have many different document retention policies. In general, ephemeral documents and electronic records are subject to different sets of document retention policies. For example, an organization may have a document retention policy that specifies that ephemeral documents must be deleted within one year from the time they were last modified. In this example, the organization may have a document retention policy that specifies that electronic records must be preserved for at least seven years.

Document retention policies may be designed for a wide variety of purposes. In one example, document retention policies may be designed to ensure compliance with governmental or organizational regulations. In another example, document retention policies may be designed to serve a variety of business purposes, such as preserving electronic documents for purposes of non-repudiation of contracts, maintenance of organizational memory, compliance with electronic discovery orders, and other business purposes. In a third example, an organization may design its document retention policies to expedite the deletion of ephemeral documents to reduce the organization's data storage costs.

Typically, organizations store ordinary electronic documents and electronic records in separate repositories. For example, employees of an enterprise may create and edit electronic documents stored on a first file server. In this example, when an electronic document is declared to be an electronic record, the electronic document is moved from the first file server to a second file server. After the electronic document is moved to the second file server, the electronic document is subject to special document retention policies.

SUMMARY

This disclosure describes techniques of managing electronic documents as electronic records that do not require moving the electronic documents to a different repository. As described herein, an electronic document is stored at a first repository prior to a time when the electronic document is declared to be an electronic record. An administrator is able to configure a document management system (DMS) to manage the electronic document as an electronic record after the electronic document is declared to be an electronic record. In addition, the administrator is able to configure the DMS to store a copy of the electronic document at a second repository after the electronic document is declared to be an electronic record and to manage the copy of the electronic document as an electronic record.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

As briefly described above, this disclosure describes techniques for managing electronic documents as electronic records that do not require moving the electronic documents to a different repository when electronic documents are declared to be electronic records. As described below, a document management system provides an administrative interface that allows an administrator to specify a record storage policy for an electronic document stored at a first repository. The record storage policy for the electronic document may require the document management system to manage the electronic document as an electronic record without moving the electronic document from the first repository. Alternatively, the record storage policy for the electronic document may require the document management system to create a copy of the electronic document at a second repository and to manage the copy of the electronic document as an electronic record. As described herein, the document management system manages an electronic document as an electronic record by enforcing record behavior policies associated with the electronic document. The record behavior policies for an electronic document ensure that the electronic document is preserved for later reference. In the following description, various examples are described. It should be appreciated that these examples are provided for purposes of explanation and not as express or implied limitations on the scopes of the claims.

Figure 1:
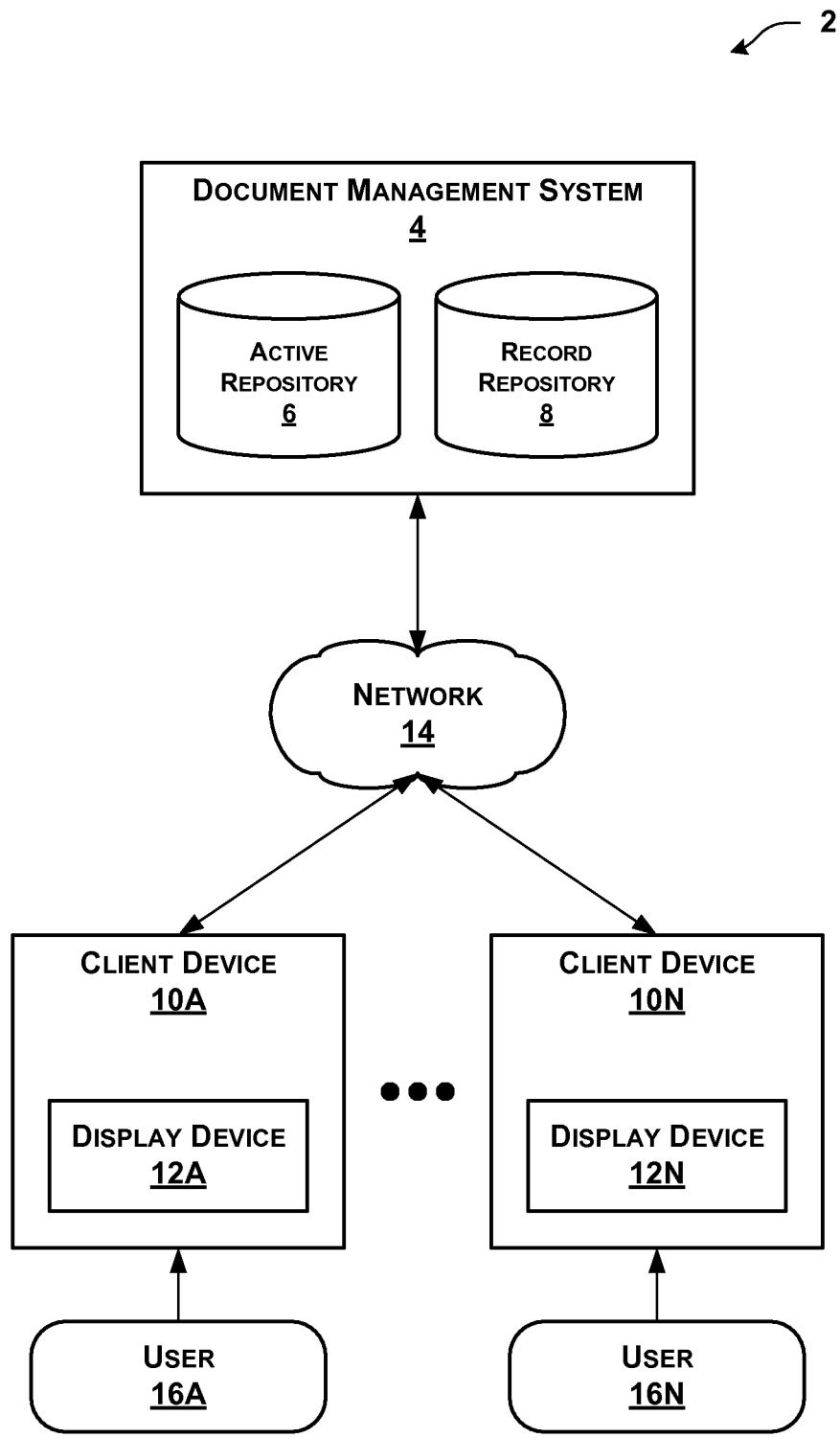
FIG. 1 illustrates an example system in which the electronic records management techniques of this disclosure are utilized.

FIG. 1 illustrates an example system 2 in which the electronic records management techniques of this disclosure are utilized. As illustrated in the example of FIG. 1, system 2 comprises a document management system 4. Document management system 4 may be implemented in a wide variety of ways. For instance, document management system 4 may be implemented as a collection of one or more physical units. These physical units may be standalone server devices, server blades, personal computers, intermediate network devices, or other types of physical electronic computing units.

As illustrated in the example of FIG. 1, document management system 4 includes an active repository 6 and a record repository 8. As used in this disclosure, a "repository" is a logical structure that is capable of containing electronic documents. For example, relational databases, file systems, directory structures, and disk partitions are examples of repositories. Active repository 6 is a set of one or more computer-readable storage media that store electronic documents. As described in detail below, the electronic documents stored at active repository 6 may or may not be electronic records. Record repository 8 is a set of one or more computer-readable storage media that store electronic records. Active repository 6 and record repository 8 are separate repositories in the sense that they are separate logical structures and consequently, cannot include the same copy of an electronic document.

Active repository 6 may store ephemeral documents, electronic documents that have been declared to be electronic records, and other types of electronic documents. In some implementations, the ephemeral documents in active repository 6 may be subject to document retention policies. For instance, the ephemeral documents in active repository 6 may be subject to a document retention policy that requires document management system 4 to purge all ephemeral documents that have not been edited or viewed in one year.

Each electronic document stored at active repository 6 is associated with a context. As used in this disclosure, a "context" of an electronic document is a collection of electronic documents that are presented together. For example, the electronic documents in a folder may be within a common context. One example of a context includes, without limitation, a hierarchical directory with folders, with each folder including electronic documents that are related in some manner. Other types of contexts also exist, such as metadata that is used to group related files. Frequently, electronic documents within a context are used together for a common purpose. For example, a law firm may establish a separate context for each lawsuit that attorneys of the law firm are working on. In this example, a first electronic document in such a context may be a word processor document that contains a complaint and a second electronic document in the context may be a PDF document that contains an answer to the complaint.

System 2 also comprises a set of client devices 10A through 10N (collectively, "client devices 10"). Client devices 10 may be a wide variety of different types of computing devices. For example, client devices 10 may be personal computers, notebook computers, television set top boxes, personal media players, computing devices integrated into vehicles, mobile telephones, or other types of computing devices.

Instances of a web browser application may execute on each of client devices 10. For example, an instance of the Microsoft INTERNET EXPLORER™ internet browser, the Mozilla Firefox internet browser, the Google Chrome internet browser, the Apple Safari internet browser, the BlackBerry internet browser, a microbrowser, or another type of internet browser may operate on one or more of client devices 10.

A set of display devices 12A-12N (collectively, "display devices 12") are included in client devices 10. Display devices 12 may be a wide variety of different types of display devices. For example, one or more of display devices 12 may be a liquid crystal display (LCD) screen, a plasma display screen, a cathode ray tube screen, a light-emitting diode (LED) array, or another type of display device. In some circumstances, one or more of display devices 12 may be physically integrated into client devices 10 as a single physical unit, as is the case with most cellular telephones. In other circumstances, one or more of client devices 10 may be implemented in multiple physical units, as is the case with most desktop personal computers.

A network 14 facilitates communication between client devices 10 and document management system 4. Network 14 may include a wide variety of different types of network. For example, network 14 may include a wide-area network, such as the Internet. In another instance, network 14 may include a local-area network (LAN), a metropolitan-area network, or another type of network. Furthermore, network 14 may include one or more wired communication links and one or more wireless communication links. A variety of communications protocols may be used on the wireless communication links in network 14 including the WiFi protocol, the Bluetooth protocol, the WiMax protocol, the Global System for Mobile communications (GSM) protocol, the Universal Mobile Telecommunications System (UMTS) protocol, the Code Division Multiple Access (CDMA) protocol, or another wireless communications protocol.

As illustrated in the example of FIG. 1, a set of users 16A-16N (collectively, "users 16") utilize respective ones of client devices 10. Users 16 can use client devices 10 to access electronic documents stored by document management system 4 in active repository 6 and record repository 8. For example, to access electronic documents stored by document management system 4, user 16A may use the internet browser application executing on client device 10A to request a document access interface webpage that includes a list of documents stored in active repository 6 and/or record repository 8 within a particular context. In response to this request, document management system 4 generates the document access interface webpage and sends the document access interface webpage to client device 10A. When client device 10A receives the document access interface webpage, the web browser application executing on client device 10A presents the document access interface webpage. Subsequently, user 16A may select an electronic document from the list of electronic documents included in the document access interface page. When user 16A selects the electronic document, the web browser application executing on client device 10A sends a request for the electronic document to document management system 4. In response to the request for the electronic document, document management system 4 sends the electronic document to client device 10A. After client device 10A receives the electronic document, an appropriate application executing on client device 10A may allow user 16A to interact with the electronic document. For instance, a word processing application, such as the Microsoft Word word processing application, executing on client device 10A may allow user 16A to interact with the electronic document when the electronic documents is a word processing document. In another instance, a spreadsheet application, such as Microsoft EXCEL® spreadsheet software, executing on client device 10A may allow user 16A to interact with the electronic document when the electronic document is a spreadsheet document.

Users 16, when acting as administrators, may also interact with client devices 10 to configure how document management system 4 manages electronic records. To enable users 16 to configure how document management system 4 manages electronic records, document management system 4 presents an administrative interface (see, e.g., FIG. 6, described below). For example, user 16A, acting as an administrator, may use the web browser application executing on client device 10A to request an administrative interface webpage. In response to the request for the administrative interface webpage, document management system 4 may generate the administrative interface webpage and send the administrative interface webpage to client device 10A. The web browser application executing on client device 10A may then display the administrative interface webpage on display device 12A.

The administrative interface allows an administrator (e.g., user 16A) to specify a record declaration policy for one or more electronic documents stored at active repository 6. As used in this disclosure, a "record declaration policy" for an electronic document specifies a set of circumstances under which the electronic document is allowed to be declared to be an electronic record. The administrator may specify different record declaration policies for different electronic documents. When the administrator specifies a record declaration policy, document management system 4 receives input that indicates the record declaration policy.

The administrator may specify the record declaration policy by selecting the record declaration policy from a group of record declaration policies presented by the administrative interface. For example, the group of record declaration policies may include a first record declaration policy that requires document management system 4 to allow any author of an electronic document to declare the document to be an electronic record. Furthermore, in this example, the group of record declaration policies may include a second record declaration policy that requires document management system 4 to exclusively allow an administrator to declare an electronic document to be an electronic record. In addition, in this example, the group of record declaration policies may include a third record declaration policy that requires document management system 4 to automatically declare an electronic document to be an electronic record when an event occurs. This event may be a wide variety of events. For instance, the event may be the passing of a specific amount of time since the electronic document was last edited. Furthermore, in this example, the group of record declaration policies may include a fourth record declaration policy that requires document management system 4 to automatically declare an electronic document to be an electronic record when instructed to do so by a workflow operation.

The administrative interface also allows the administrator to specify a record storage policy for one or more electronic documents stored at active repository 6. As used in this disclosure, a "record storage policy" for an electronic document specifies a location where the electronic document is stored when the electronic document is declared to be an electronic record. The administrator may specify different record storage policies for different electronic documents. When the administrator specifies a record storage policy, document management system 4 receives input that indicates the record storage policy.

The administrator may specify the record storage policy by selecting the record storage policy from a plurality of record storage policies presented by the administrative interface. For example, the administrator may select a first record storage policy for an electronic document within a context that requires document management system 4 to create a copy of electronic document at record repository 8, delete the electronic document at active repository 6, and to create a link to the electronic document within the context at active repository 6. Subsequently, document management system 4 manages the copy of the electronic document at record repository 8 as an electronic record. As discussed above, each electronic document in active repository 6 is associated with a context. Furthermore, as discussed above, document management system 4 may provide document access interfaces that contain lists of documents stored at active repository 6 associated with contexts. When a context contains a link to an electronic record stored at record repository 8, a document access interface that contains a list of documents associated with the context contains a selectable reference to the electronic record. When the user selects the selectable reference to the electronic record, document management system 4 retrieves the electronic record from record repository 8 and provides the electronic record to the client device.

In a second example, the administrator may select a second record storage policy that requires document management system 4 to create, at record repository 8, a copy of an electronic document stored at active repository 6. If the administrator selects this second record storage policy, document management system 4 manages the copy of the electronic document as an electronic record. For instance, users 16 may still be able to edit or delete the copy of the electronic document stored at active repository 6, but may not be able to edit or delete the copy of the electronic document stored at record repository 8.

In a third example, the administrator may select a third record storage policy that requires document management system 4 to leave an electronic document at active repository 6 in a context of the electronic document after the electronic document has been declared to be an electronic record. Consequently, after the electronic document has been declared to be an electronic record, the electronic document remains stored at active repository 6, but document management system 4 manages the electronic document as an electronic record. Because document management system 4 manages the electronic document as an electronic record, the behavior of the electronic document changes. For instance, if the administrator selects this third record storage policy for the electronic document, the behavior of the electronic document may be changed such that users 16 cannot delete or edit the electronic document. In another example, if the administrator selects this third record storage policy for the electronic file document management system 4 may change the behavior of the electronic document such that the electronic document is automatically deleted after a given amount of time or after a business process event has occurred.

The administrative interface may also allow the administrator to specify a record behavior policy for the electronic document. As used in this disclosure, a "record behavior policy" for an electronic document is a policy that specifies a behavior of the electronic document after the electronic document is declared to be an electronic record. In general, the record behavior policies for an electronic document ensures that the electronic document is preserved for later reference. Furthermore, the record behavior policies for an electronic document may include document retention policies that require document management system 4 to purge the electronic record after a given amount of time. It should be noted that document management system 4 allows the administrator to specify different record behavior policies for different electronic documents. When the administrator specifies the record behavior policy for an electronic document, document management system 4 receives input that indicates that the administrator has specified the record behavior policy for the electronic document.

The administrator may specify the record behavior policy for an electronic record by selecting the record behavior policy from a group of record behavior policies presented by the administrative interface. For example, the group of record behavior policies may include a first record behavior policy that requires document management system 4 to implement a retention policy for the electronic document. Furthermore, in this example, the group of record behavior policies may include a second record behavior policy that requires document management system 4 to prevent users 16 from editing or deleting the electronic document.

The administrator may select the record declaration policy, the record storage policy, and the record behavior policy of an electronic document in a variety of ways. For example, the administrator may select the record declaration policy, the record storage policy, and/or the record behavior policy specifically for an individual electronic record. In another example, the administrator may select the record declaration policy, the record storage policy, and/or the record behavior policy for an electronic document by selecting the record declaration policy, the record storage policy, and the record behavior policy for a group of electronic documents that contains the electronic document. The group of electronic documents may be defined in a variety of ways. For instance, the group of electronic documents may be all electronic documents in a context, all electronic documents in a folder, all electronic documents belonging to a specific file type, all electronic documents having a particular type of metadata, an individually-selected set of electronic documents, or other groups of documents.

After document management system 4 receives the record declaration policy, the record storage policy, and/or the record behavior policy for an electronic document, document management system 4 enforces these policies. Document management system 4 may enforce these policies in a variety of ways depending on which policies the administrator selected. For example, document management system 4 may enforce a record storage policy that requires document management system 4 to create a copy of an electronic document at record repository 8 by creating the copy of the electronic document at record repository 8 when the electronic document is declared to be an electronic record.

Figure 2:
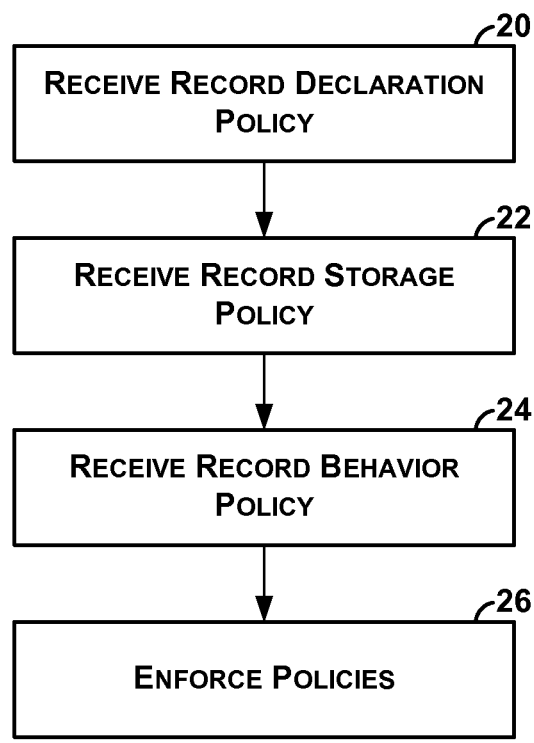
FIG. 2 is a flowchart illustrating an example general operation of the document management system.

FIG. 2 is a flowchart illustrating an example general operation of document management system 4. As illustrated in the example of FIG. 2, document management system 4 receives input that specifies a record declaration policy for an electronic document (20). Document management system 4 may receive input that specifies the record declaration policy for the electronic document by specifying that the record declaration policy is applicable to electronic document in a variety of different scopes that include the electronic document. For example, document management system 4 may receive input that specifies that the record declaration policy is applicable to all electronic documents in a context that includes the electronic document. In a second example, document management system 4 may receive input that specifies that the record declaration policy is applicable to just the electronic document. In a third example, document management system 4 may receive input that specifies that the record declaration policy is applicable to a group of contexts.

Document management system 4 then receives input that specifies a record storage policy for the electronic document (22). Like the input that specifies the record declaration policy for the electronic document, document management system 4 may receive input that specifies that the record storage policy is applicable to a scope that includes the electronic document.

Next, document management system 4 receives input that specifies a record behavior policy for the electronic document (24). Like the input that specifies the record declaration policy and the record storage policy for the electronic document, document management system 4 may receive input that specifies that the record behavior policy is applicable to a scope that includes the electronic document.

After receiving the record declaration policy for the electronic document, the record storage policy for the electronic document, and the record behavior policy for the electronic document, document management system 4 enforces the record declaration policy, the record storage policy, and the record behavior policy (26).

Figure 3:
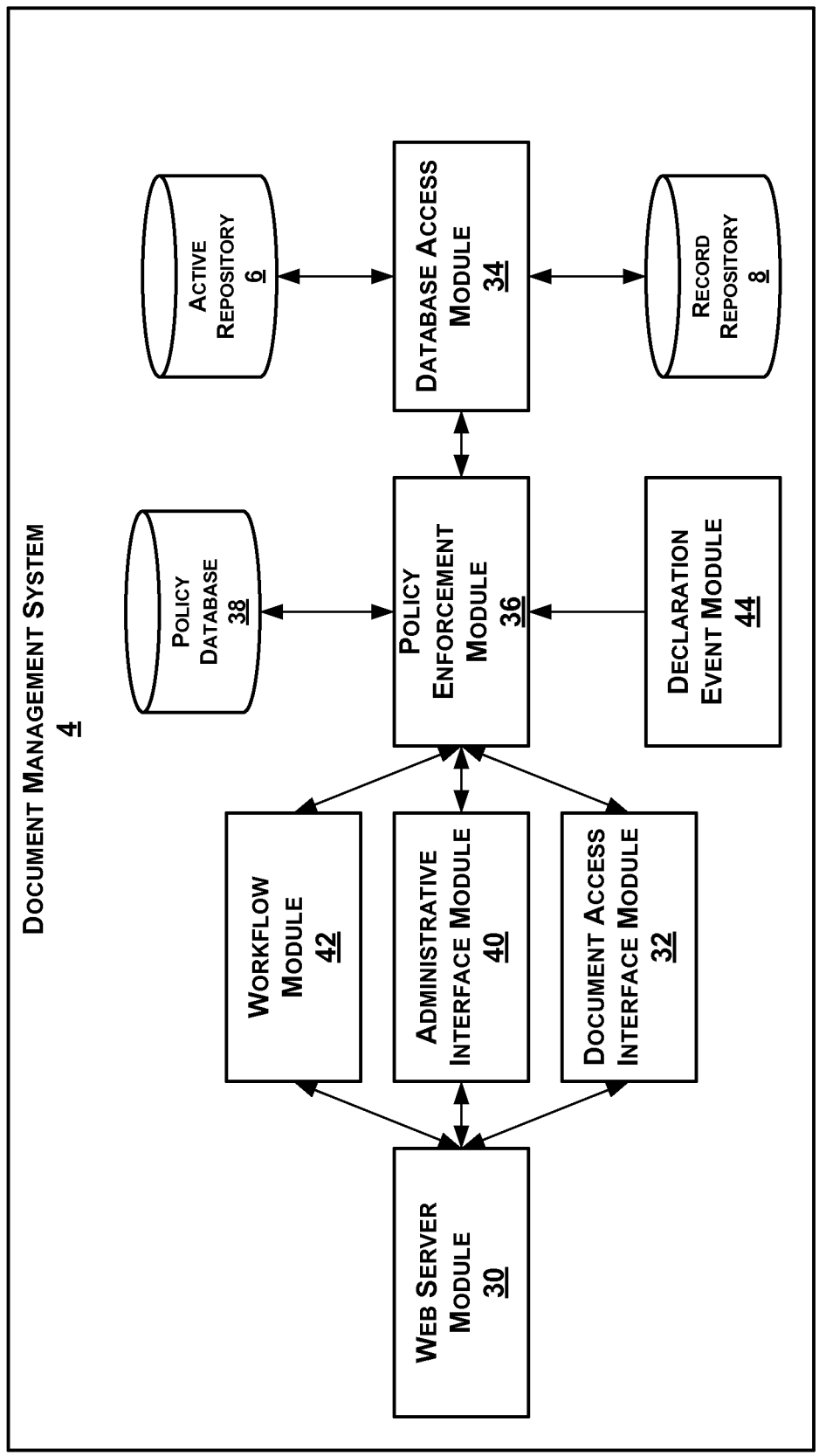
FIG. 3 is a block diagram that illustrates example logical components of a document management system.

FIG. 3 is a block diagram that illustrates example logical components of document management system 4. Each of the modules illustrated in the example of FIG. 3 may comprise a set of instructions stored on a computer-readable storage medium. In other implementations, one or more of the modules illustrated in the example of FIG. 3 may be specialized hardware units.

As illustrated in the example of FIG. 3, document management system 4 comprises a web server module 30. Web server module 30 receives requests from client devices 10 via network 14. For instance, web server module 30 may receive Hypertext Transfer Protocol (HTTP) requests from client devices 10 via network 14. Web server module 30 may receive requests for a variety of different resources. For instance, web server module 30 may receive a request associated with a document access interface. In another instance, web server module 30 may receive a request for a resource associated with a workflow. In another instance, web server module 30 may receive a request associated with an administrative interface.

When web server module 30 receives a request associated with a document access interface, web server module 30 utilizes a document access module 32 to process the request. For instance, when web server module 30 receives a request for a document access interface, web server module 30 utilizes document access module 32 to generate the document access interface. In the example of FIG. 3, document access module 32 generates the document access interface by interacting with a database access module 34. Database access module 34 retrieves documents from and stores documents to active repository 6 and record repository 8.

To generate the document access interface, document access module 32 may retrieve the metadata of each electronic document in a context. The metadata of an electronic document may include a filename of the electronic document, a date that the electronic document was last modified, a name of the author of the electronic document, a value that indicates whether the electronic document is an electronic record, a value that indicates whether the electronic document is a link to an electronic record, and/or other types of metadata. After retrieving the metadata of each electronic document in the context, document access module 32 may generate a webpage that includes some or all of the metadata of each of the electronic documents in the context. Once document access module 32 has generated the webpage, web server module 30 may generate a HTTP response that includes the webpage and may send this HTTP response to the requesting client.

Furthermore, web server module 30 may receive a request to perform an action on an electronic document listed in a document access interface. When web server module 30 receives this request, web server module 30 may provide the request to document access interface module 32. Document access interface module 32 provides an instruction to perform the action to policy enforcement module 36. Upon receiving the instruction to perform the action, policy enforcement module 36 uses the policies in policy database 38 to determine whether the policies allow the action to be performed. If the policies allow the action to be performed, policy enforcement module 36 instructs the database access module 34 to perform the action using active repository 6 and/or record repository 8.

After the action is performed, document access interface module 32 may generate a new webpage containing the document access interface and may provide this new webpage to web server module 30 for transmission to the request client device. For example, document access interface module 32 may receive a request from a user of a client device to declare an electronic document stored in active repository 6 to be an electronic record. In this example, document action module 38 instructs policy enforcement module 36 to perform the action and policy enforcement module 36 uses the policies in policy database 38 to determine whether the user is allowed to declare the electronic document to be an electronic record. If the policies in policy database 38 allow the user to declare the electronic document to be an electronic record, policy enforcement module 36 instructs database access module 34 to update active repository 6 and/or record repository 8 to declare the electronic document to be an electronic record.

Web server module 30 may also receive a request for an administrative interface from a requesting client device. When web server module 30 receives a request for an administrative interface, web server module 30 may provide the request to an administrative interface module 40. Administrative interface module 40 may, in response to the request, generate one or more documents (e.g., Hypertext Markup Language (HTML) or extensible markup language (XML) documents) that represent some or all of the administrative interface. Web server module 30 may generate one or more responses that contain the documents and send these responses to the requesting client device.

Furthermore, web server module 30 may receive a request via the administrative interface to input a record management policy, such as a record declaration policy, a record storage policy, or a record behavior policy. When web server module 30 receives this request, administrative interface module 40 may instruct policy enforcement module 30 to update policy database 38 to include the record management policy. After policy enforcement module 36 updates policy database 38, administrative interface module 40 may generate one or more documents that represent an updated version of the administrative interface. Web server module 30 may then generate one or more responses that contain these documents and send these responses to the requesting client device.

As illustrated in the example of FIG. 3, document management system 4 may include a workflow module 42. Workflow module 42 manages workflows. As used in this disclosure, a "workflow" is a pattern of discrete tasks needed to perform primary a task. Each subtask may be an interaction between a person and an electronic computing system or an interaction between two or more electronic computing systems. For example, an organization may establish a workflow that defines a pattern of operations between one or more users and a computing system to perform the task of submitting and authorizing an expense request. In this example, a first user may perform a first operation by entering information about the expense request into a first webpage. Furthermore, in this example, a second operation may be a second user reviewing the information about the expense request in a second webpage. A third operation, in this example, may be the second user using the second webpage to authorize the expense request. A fourth operation, in this example, is a billing department receiving notification of the authorization of the expense request via email. A fifth operation, in this example, may be the billing department using a third webpage to record the expense in an account payable ledger.

In some circumstances, web server module 30 may receive a request related to an operation of a workflow managed by workflow module 42. When web server module 30 receives a request related to an operation of a workflow managed by workflow module 42, workflow module 42 may perform a variety of different actions. For instance, workflow module 42 may mark the operation of the workflow as complete and send an e-mail message to a user. In other instances, workflow module 42 may automatically instruct policy enforcement module 36 declare an electronic document to be an electronic record. For example, a user may complete an operation of a workflow by noting that a sale has closed. In this example, workflow module 42 may automatically instruct policy enforcement module 36 to declare a sales contract for the sale to be an electronic record. In response, policy enforcement module 36 may declare the electronic document to be an electronic record if a record declaration policy allows the workflow to declare the electronic document to be an electronic record.

The example of FIG. 3 also illustrates that document management system 4 may include a declaration event module 44. Declaration event module 44 automatically determines whether declaration events have occurred. For example, declaration event module 44 may determine that three weeks have passed after a contract represented by an electronic document was signed. If declaration event module 44 determines that a declaration event related to an electronic document has occurred, declaration event module 44 may instruct policy enforcement module 36 to declare the electronic document to be an electronic document. In response, policy enforcement module 36 may declare the electronic document to be an electronic record if a record declaration policy allows the electronic document to be declared an electronic record when the declaration event occurs. If policy enforcement module 36 declares the electronic document to be an electronic record, policy enforcement module 36 may store the electronic document in accordance with a record storage policy for the electronic document and change the behavior of the electronic document in accordance with a record behavior policy of the electronic document. In another example, event module 44 may determine that ten years have passed after an electronic document was declared to be an electronic record. In this example, declaration event module 44 may instruct policy enforcement module 36 to delete the electronic document. In this example, policy enforcement module 36 may delete the electronic document if a record behavior policy for the electronic document allows the electronic document to be deleted when ten years have passed after the electronic document was declared to be an electronic record.

Figure 4:
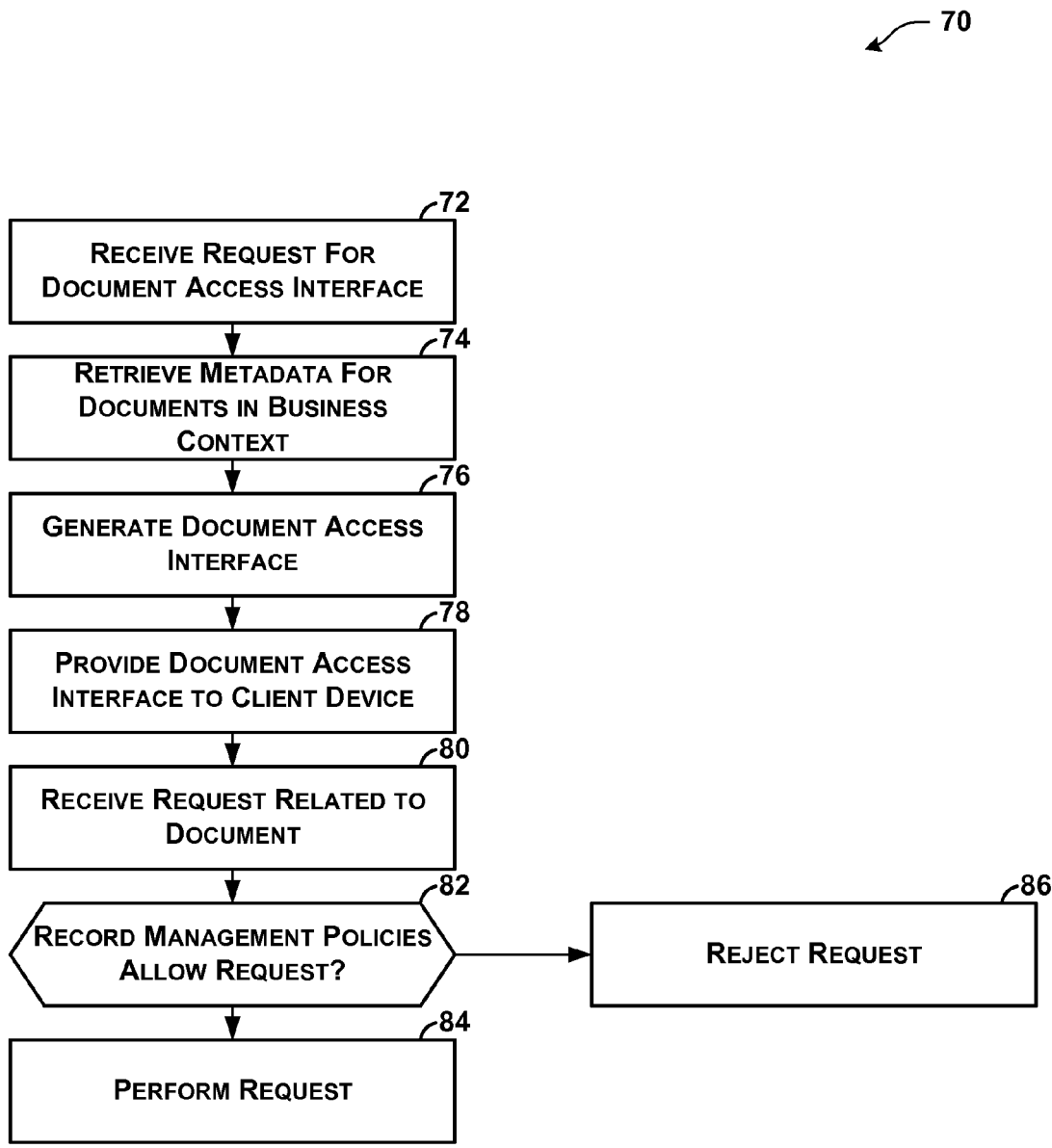
FIG. 4 is a flowchart illustrating an example operation of the document management system in response to a request for a document access interface.

FIG. 4 is a flowchart illustrating an example operation 70 of document management system 4 in response to a request for a document access interface. As illustrated in the example of FIG. 4, operation 70 may begin when web server module 30 in document management system 4 receives a request for a document access interface that contains metadata of electronic documents in a context (72). The metadata of an electronic document may include a file name of the electronic document, a time and date that the electronic document was last modified, a name of a user who last modified the electronic document, the type of the electronic document, and/or other types of information about the electronic document. The type of the electronic document may indicate whether the electronic document is an electronic record, a link to an electronic record, or a non-record electronic document. Furthermore, the type of the electronic document may indicate that the electronic document is associated with a specific software application, such as the Microsoft Word word processing application or the Adobe Acrobat portable document file viewing application.

When web server module 30 receives the request for the document access interface, document access module 32 retrieves the metadata of the electronic documents in the context (74). To retrieve the metadata of electronic documents in the context, document access module 32 may interact with database access module 34 to retrieve the metadata of the documents in the context.

After retrieving the metadata of the documents in the context, document access module 32 generates the document access interface that contains the metadata of the documents in the context (76). Document access module 32 may generate the document access interface in a variety of ways. For instance, document access module 32 may generate a set of one or more documents. These documents may include markup language code (e.g., HTML, XML, etc.) that define the document access interface. The document access interface may be generated as a plurality of documents when Asynchronous JavaScript and XML (AJAX) technology is used because each of the documents can be sent to a requesting client device separately upon request.

When document access module 32 has generated the document access interface, web server module 30 may provide the document access interface to the requesting client device (78).

Subsequently, web server module 30 may receive, from the client device, a request to perform an action on an electronic document in the context (80). The client device may make such a request to perform an action on the document when a user of the client device selects the action on the document access interface. The client device may request to perform a variety of different types of actions on the electronic document. For example, the client device may request to delete the electronic document. In a second example, the client device may request to open the electronic document for editing. In a third example, the client device may request to open the electronic document for reading only. In a fourth example, the client device may request to save changes made to the electronic document. In a fifth example, the client device may request to declare the electronic document to be an electronic record.

When web server module 30 receives the request to perform the action on the electronic document, policy enforcement module 36 in document management system 4 determines whether the policies stored in policy database 38 allow the user of the client device to perform the action on the electronic document (82). If policy enforcement module 36 determines that the policies in policy database 38 allow the user of the client device to perform the action on the electronic document ("YES" of 82), policy enforcement module 36 performs the action on the electronic document (84). For example, if the request is a request to declare the electronic document to be an electronic record and a record storage policy for the electronic document indicates that the electronic document is to remain at active repository 6, policy enforcement module 36 may update a value in active repository 6 to indicate that the electronic document is an electronic record.

On the other hand, if policy enforcement module 36 determines that the policies in policy database 38 do not allow the user of the client device to perform the action on the electronic document ("NO" of 82), policy enforcement module 36 does not perform the action on the electronic document (86). For example, if the request is a request to delete the electronic document and the electronic document is an electronic record and a record behavior policy for the electronic document specifies that the user is not allowed to delete the electronic document, policy enforcement module 36 does not delete the electronic document. In this way, policy enforcement module 36 acts to enforce the policies in policy database 38.

Figure 5:
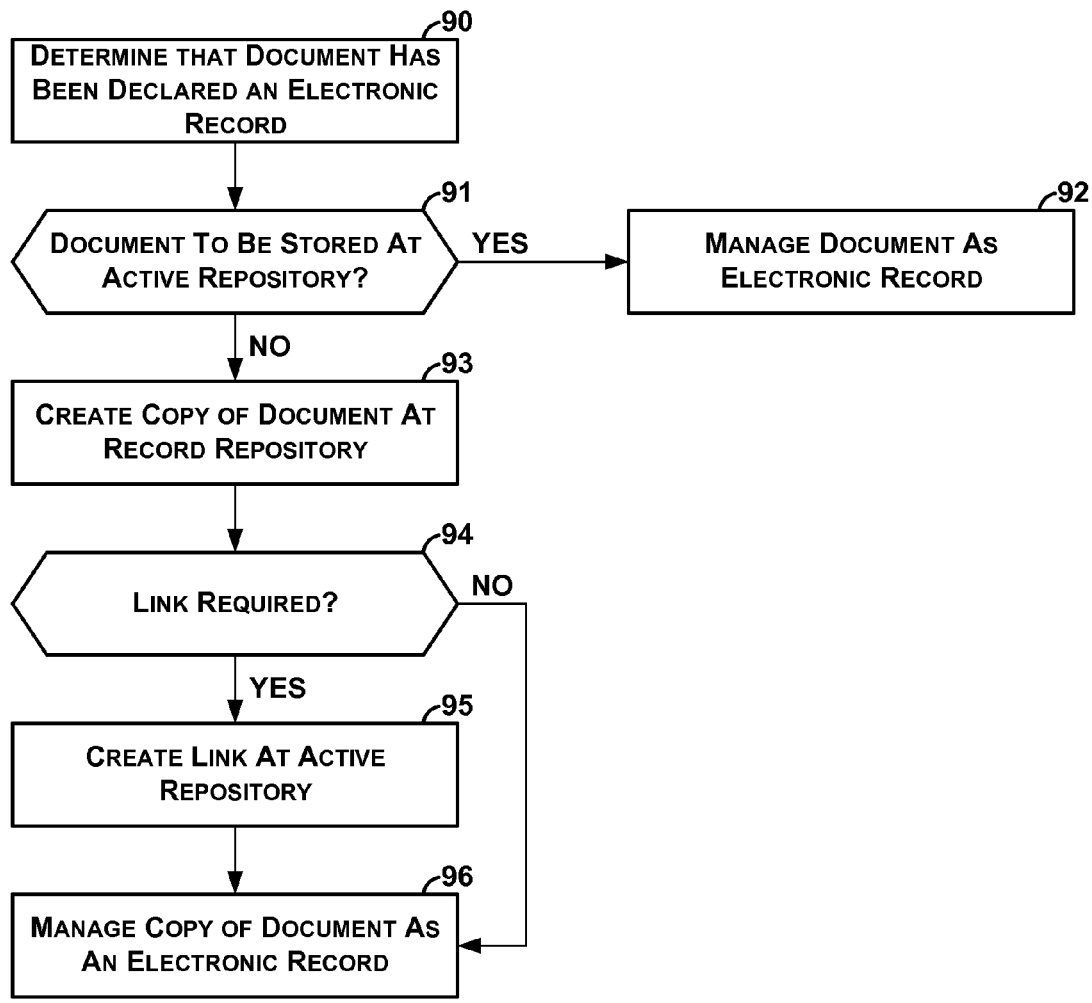
FIG. 5 is a flowchart illustrating an example operation performed by policy enforcement module 36 to enforce a record storage policy.

FIG. 5 is a flowchart illustrating an example operation performed by policy enforcement module 36 to enforce a record storage policy. As illustrated in FIG. 5, the operation begins when policy enforcement module 36 determines that an electronic document has been declared to be an electronic record (90). For instance, policy enforcement module 36 may determine that an electronic document has been declared to be an electronic record when policy enforcement module 36 receives a request from document access interface module 32 to declare the electronic document to be an electronic record and policy enforcement module 36 determines that a record declaration policy for the electronic document allows the electronic document to be declared to be an electronic record.

Next, policy enforcement module 36 determines whether a record storage policy for the electronic document requires document management system 4 to store the electronic document at active repository 6 (91). If policy enforcement module 36 determines that the record storage policy requires document management system 4 to store the electronic document at active repository 6 ("YES" of 91), policy enforcement module 36 manages the electronic document as an electronic record (92). For instance, policy enforcement module 36 may change a metadata value of the electronic document to indicate that the electronic document is an electronic record. Furthermore, policy enforcement module 36 may enforce record behavior policies that ensure the preservation of the electronic document.

On the other hand, if policy enforcement module 36 determines that the record storage policy does not require document management system 4 to store the electronic document at active repository 6, policy enforcement module 36 has, in the example of FIG. 5, effectively determined that the record storage policy requires document management system 4 to store the electronic document at record repository 8. Accordingly, if policy enforcement module 36 determines that the record storage policy does not require document management system 4 to store the electronic document at active repository 6 ("NO" of 91), policy enforcement module 36 creates a copy of the electronic document at record repository 8 (93). After policy enforcement module 36 creates a copy of the electronic document at record repository 8, policy enforcement module 36 determines whether the record storage policy requires document management system 4 to create a link at active repository 6 to the copy of the electronic document stored at record repository 8 (94).

If policy enforcement module 36 determines that the record storage policy requires document management system 4 to create a link at active repository 6 to the copy of the electronic document stored at record repository 8 ("YES" 94), policy enforcement module 36 creates a link at active repository 6 to the copy of the electronic document stored at record repository 8 (95). After policy enforcement module 36 creates the link, document management system 4 manages the copy of the electronic document as an electronic record (96).

If policy enforcement module 36 determines that the record storage policy does not require document management system 4 to create a link at active repository 6 to the copy of the electronic document stored at record repository 8 ("NO" of 94), policy enforcement module 36 manages the copy of the electronic document stored at record repository 8 as an electronic record (96).

Figure 6:
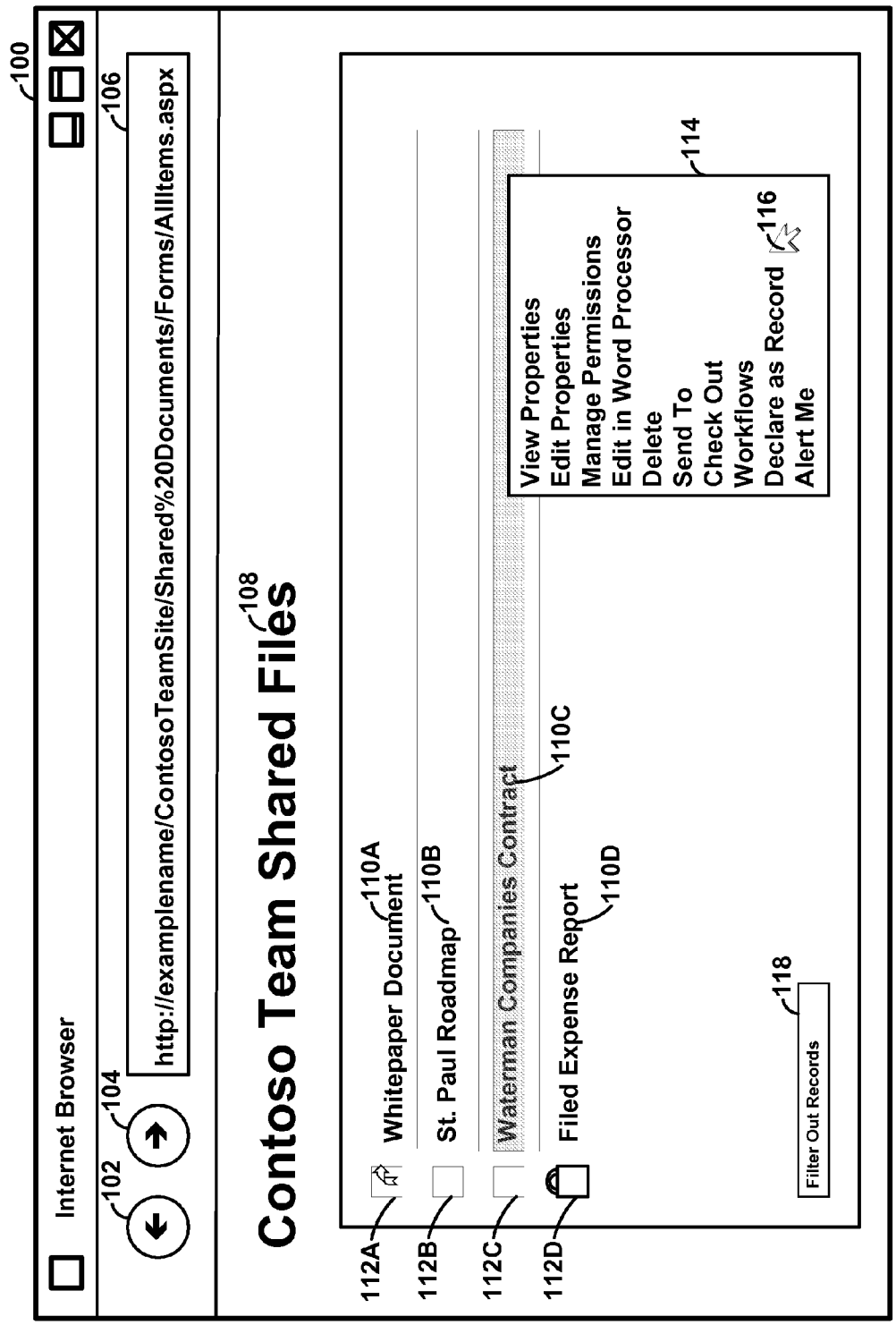
FIG. 6 is a diagram illustrating an example document access interface.

FIG. 6 is a diagram illustrating an example document access interface 100. Document access interface 100 may be presented on a display device at a client device by an Internet browser operating at the client device. The following description describes document access interface 100 with reference to client device 10A, display device 12A, and user 16A. However, it should be appreciated that document access interface 100 may be presented on any of display devices 12 at any of client devices 10.

As illustrated in the example of FIG. 6, document access interface 100 is a user interface presented by an Internet browser operating at client device 10A. Because document access interface 100 is a user interface presented by an Internet browser, document access interface 100 includes Internet browser controls, including a back button 102, a forward button 104, and an address entry box 106. Address entry box 106 contains a Uniform Resource Locator (URL) of a resource presented in the document access interface 100. In the example of FIG. 6, address entry box 106 contains the URL "http://examplename/ContosoTeamSite/Shared%20Documents/Forms/AllItems.aspx."

Document access interface 100 includes a title 108 that specifies a title of a context. In the example of FIG. 6, title 108 specifies that the title of the current context is "Contoso Team Shared Files."

Listed below title 108 are the filenames 110A-110D of electronic documents in the current context. In the example of FIG. 6, the "Contoso Team Shared Files" context includes four electronic documents: "Whitepaper Document," "St. Paul Roadmap," "Waterman Companies Contract," and "Filed Expense Report."

Document access interface 100 includes icons 112A-112D (collectively, "icons 112"). Each of icons 112 is associated with one of the electronic documents in the current context. Icons 112 indicate information about their associated electronic documents. For instance, icon 112A includes an arrow, thereby visually indicating that the electronic document titled "Whitepaper document" is a link to an electronic record in record repository 8. Icon 112D is shaped like a padlock, thereby visually indicating that the electronic document titled "Filed Expense Report" is an electronic record stored in active repository 6. Icons 112B and 112C are not arrows or locks, and consequently visually indicate that the associated electronic documents "St. Paul Roadmap" and "Waterman Companies Contract" are not electronic records or links to electronic records.

Document access interface 100 also includes a pop-up menu 114. Pop-up menu 114 may appear in document access interface 100 when user 16A selects a title of an electronic document listed in document access interface 100. In one instance, user 16A may cause pop-up menu to appear in document access interface 100 by right clicking on a title of one of the electronic documents listed in document access interface 100. As illustrated in the example of FIG. 6, user 16A has selected the electronic document titled "Waterman Companies Contract" using a cursor 116. An area around the title 112C of the electronic document titled "Waterman Companies Contract" has been shaded to visually indicate that user 16A has selected the electronic document titled "Waterman Companies Contract."

Pop-up menu 114 includes a plurality of selectable controls. In the example of FIG. 6, pop-up menu 114 includes the following selectable controls: "View Properties," "Edit Properties," "Manage Permissions," "Edit In Word Processor," "Delete," "Send To," "Check Out," "Workflows," "Declare as Record," and "Alert Me." When user 16A uses cursor 116 to select one of these controls, document management system 4 may perform a corresponding action. In a first example, if user 16A selects the "Edit in Word Processor" control, client device 10A sends a request to document management system 4. In this first example, if the policies in policy database 38 allow user 16A to edit the electronic document, document management system 4 may send the electronic document to client device 10A with rights to edit the electronic document. In some instances, user 16A may be able to edit the electronic document within an interface provided by the Internet browser. In other instances, user 16A may edit the electronic document within an interface provided by a standalone word processing application, such as the Microsoft Word word processing application. In a second example, if user 16A selects the "Declare as Record" control, client device 10A sends a request to document management system 4 to declare the electronic document to be an electronic record. In this second example, policy enforcement module 36 determines whether a record declaration policy in policy database 38 allows user 16A to declare the electronic document to be an electronic record. If the record declaration policy allows user 16A to declare the electronic document to be an electronic record, policy enforcement module 36 may apply the record storage policy stored in policy database 38 for the electronic document.

As illustrated in the example of FIG. 6, document access interface 100 may include a selectable filter control 118. When user 16A selects filter control 118, document access interface 100 may be updated such that document access interface 100 does not display electronic documents that are electronic records. In the example of FIG. 6, if user 16A selected filter control 118, the updated document access control interface would not display the electronic document titled "Whitepaper Document" or the electronic document titled "Filed Expense Report." It should be appreciated that even though user 16A has selected filter control 118, the electronic documents in the "Contoso Team Shared Files" context are still in the "Contoso Team Shared Files" context, they are simply not displayed. Filtering out electronic documents that are electronic records may help user 16A to quickly identify a relevant electronic document that user 16A wants to work on. In some instances, the updated document access interface may include a selectable "remove filter" control that, when selected, causes the document access interface to display electronic documents in the current context that are electronic records.

Figure 7:
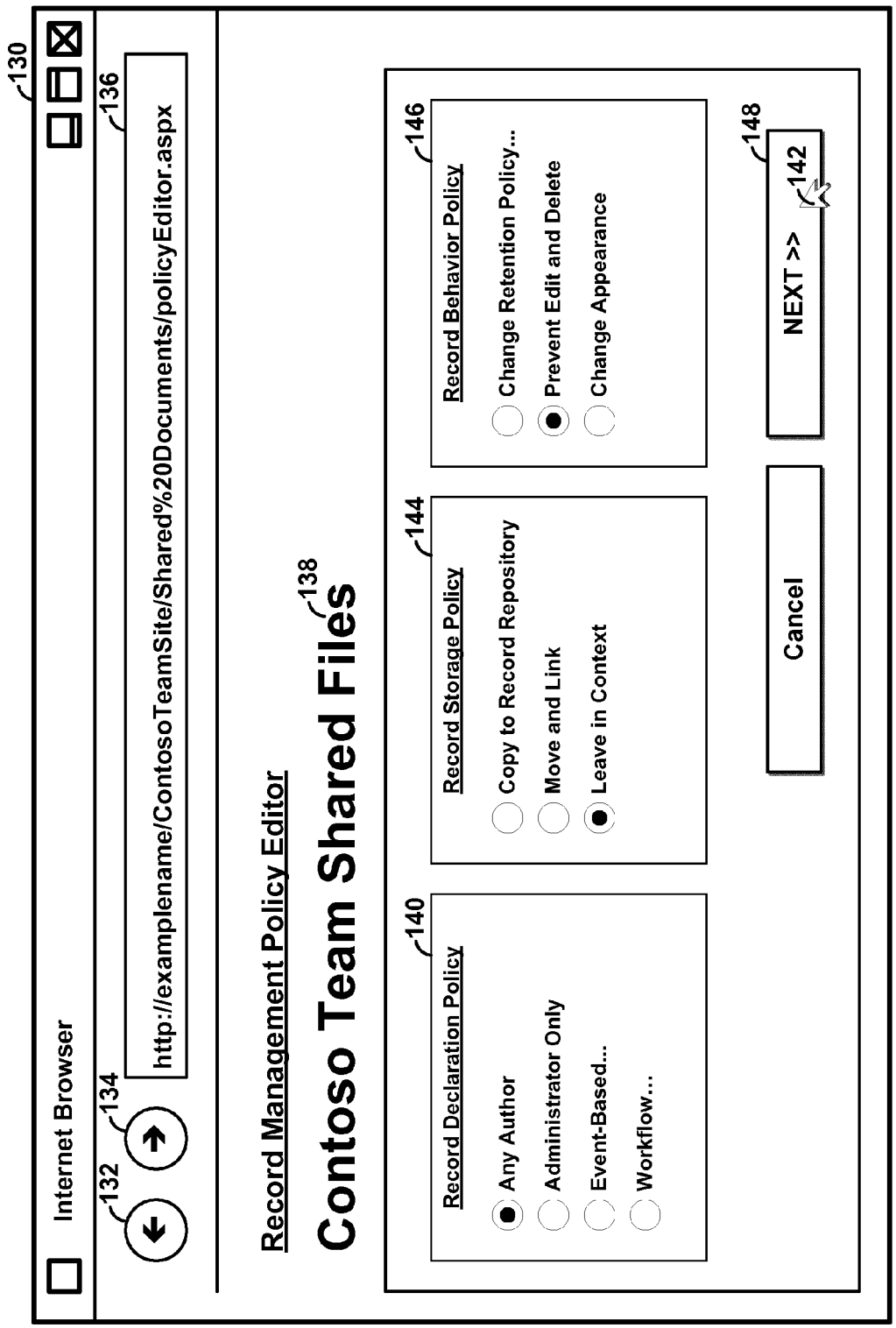
FIG. 7 is a diagram illustrating an example administrative interface.

FIG. 7 is a diagram illustrating an example administrative interface 130. Administrative interface 130 may be presented on a display device at a client device by an Internet browser operating at the client device. The following description describes administrative interface 130 with reference to client device 10A, display device 12A, and user 16A. However, it should be appreciated that administrative interface 130 may be presented on any of display devices 12 at any of client devices 10.

As illustrated in the example of FIG. 7, administrative interface 130 is a user interface presented by an Internet browser operating at client device 10A. Because administrative interface 130 is a user interface presented by an Internet browser, administrative interface 130 includes Internet browser controls, including a back button 132, a forward button 134, and an address entry box 136. Address entry box 136 contains a URL of a resource presented in administrative interface 130. In the example of FIG. 7, address entry box 136 contains the URL "http://examplename/ContosoTeamSite/Shared%20Documents/policyEditor.aspx."

As illustrated in the example of FIG. 7, administrative interface 130 includes a scope title 138. Scope title 138 displays a title of a context to which record management policies created in administrative interface 130 are applicable. In example of FIG. 7, scope title 138 displays a title of the "Contoso Team Shared Files" context. Consequently, any record management policies created in administrative interface 130 are applicable to all electronic documents within the "Contoso Team Shared Files" context. In another instance, if user 16A wanted to create record management policies that apply to a single electronic document, scope title 138 may display a title of the electronic document.

Administrative interface 130 also includes a record declaration policy box 140. Record declaration policy box 140 includes a set of radio button controls. Each of the radio button controls in record declaration policy box 140 is associated with a different record declaration policy. In the example of FIG. 7, a first radio button control in record declaration policy box 140 is associated with a record declaration policy that allows any author to declare electronic documents in the current scope to be electronic records. A second radio button control in record declaration policy box 140 is associated with a record declaration policy that allows only an administrator to declare electronic documents in the current scope to be electronic records. A third radio button control in record declaration policy box 140 is associated with a record declaration policy that allows electronic documents in the current scope to be declared to be electronic records when a particular event occurs. User 16A may have the opportunity to define the particular event in a different user interface. A fourth radio button control in record declaration policy box 140 is associated with a record declaration policy that allows electronic documents in the current scope to be declared to be electronic records based on a workflow. User 16A may have the opportunity to define how the workflow declares an electronic document to be an electronic record in a different user interface. User 16A may use a cursor 142 to select a radio button control in record declaration policy box 140. In the example of FIG. 7, user 16A has selected the first radio button control. It should be understood that other instances of record declaration policy box 140 may include more or fewer radio button controls or may include other means of selecting a record declaration policy.

Administrative interface 130 also includes a record storage policy box 144. Record storage policy box 144 includes a set of radio button controls. Each of the radio button controls in record storage policy box 144 is associated with a different record storage policy. In the example of FIG. 7, a first radio button control in record storage policy box 144 is associated with a record storage policy that requires document management system 4 to copy electronic documents in the current scope to record repository 8 when the electronic documents are declared to be electronic records. A second radio button control in record storage policy box 144 is associated with a record storage policy that requires document management system 4 to move electronic documents in the current scope to record repository 8 and to create links to the electronic documents in the current scope when the electronic documents are declared to be electronic records. A third radio button control in record storage policy box 144 is associated with a record storage policy that requires document management system 4 to leave electronic documents in the current scope when the electronic documents are declared to be electronic records. User 16A may use cursor 142 to select a radio button control in record storage policy box 144. In the example of FIG. 7, user 16A has selected the third radio button control. It should be understood that other instances of record behavior storage box 144 may include more or fewer radio button controls or may include other means of selecting a record storage policy.

Administrative interface 130 also includes a record behavior policy box 146. Record behavior policy box 146 includes a set of radio button controls. Each of the radio button controls in record behavior policy box 146 is associated with a different record behavior policy. In the example of FIG. 7, a first radio button control in record behavior policy box 146 is associated with a record behavior policy that requires document management system 4 to change a retention policy for electronic documents in the current scope when the electronic documents are declared to be electronic records. User 16A may have the opportunity to define the retention policy in a different user interface. A second radio button control in record behavior policy box 146 is associated with a record behavior policy that requires document management system 4 to prevent editing and deleting of electronic documents in the current scope when the electronic documents are declared to be electronic records. A third radio button control in record behavior policy box 146 is associated with a record behavior policy that requires document management system 4 to simply change an appearance in a document access interface of an icon associated with electronic documents in the current scope when the electronic documents are declared to be electronic records. User 16A may user cursor 142 to select a radio button control in record behavior policy box 146. In the example of FIG. 7, user 16A has selected the second radio button control. It should be understood that other instances of record behavior policy box 146 may include more or fewer radio button controls or may include other means of selecting a record behavior policy.

Administrative interface 130 also includes a "next" control 148. When user 16A selects "next" control 148, document management system 4 may receive input that specifies the record declaration policy, the record storage policy, and the record behavior policy selected in record declaration policy box 140, record storage policy box 144, and record behavior policy box 146.

Figure 8:
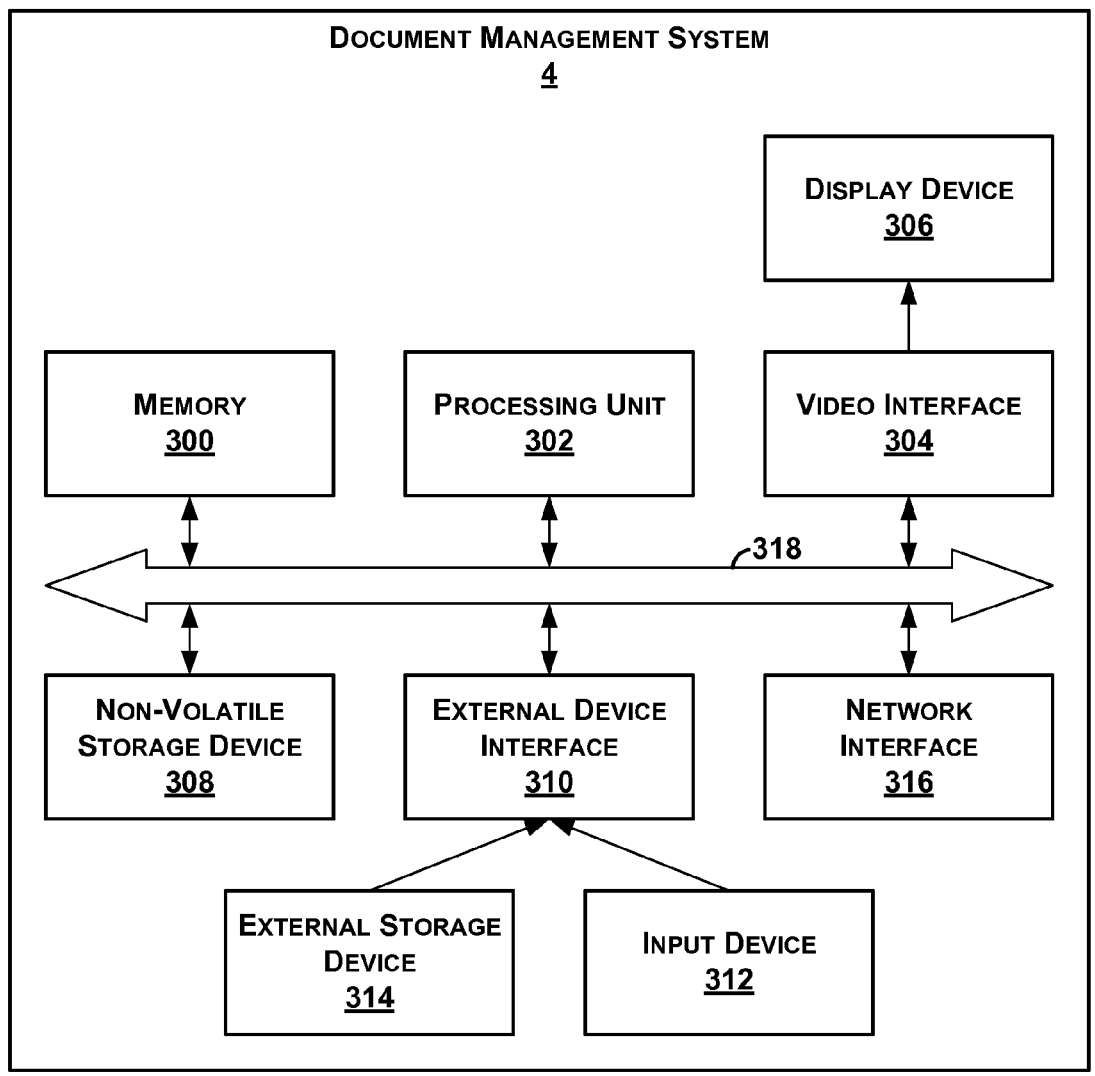
FIG. 8 is a block diagram illustrating example hardware components of the document management system.

FIG. 8 is a block diagram illustrating example details of document management system 4. As illustrated in the example of FIG. 8, document management system 4 comprises a memory unit 300. Memory unit 300 is a computer-readable storage medium that is capable of storing data and instructions. Memory unit 300 may be a variety of different types of computer-readable storage media including, but not limited to, dynamic random access memory (DRAM), double data rate synchronous dynamic random access memory (DDR SDRAM), reduced latency DRAM, DDR2 SDRAM, DDR3 SDRAM, Rambus RAM, or other types of computer-readable storage media.

In addition, document management system 4 comprises a processing unit 302 that is capable of executing instructions. Processing unit 302 may be implemented as one or more processing cores and/or as one or more separate microprocessors. For example, processing unit 302 may be implemented as one or more Intel Core 2 microprocessors. Processing unit 302 may be capable of executing instructions in an instruction set, such as the x86 instruction set, the POWER instruction set, a RISC instruction set, the SPARC instruction set, the IA-64 instruction set, the MIPS instruction set, or another instruction set.

Document management system 4 also comprises a video interface 304 that enables document management system 4 to output video information to a display device 306. Display device 306 may be a variety of different types of display devices. For instance, display device 306 may be a cathode-ray tube display, an LCD display panel, a plasma screen display panel, a touch-sensitive display panel, a LED array, or another type of display device.

In addition, document management system 4 includes a non-volatile storage device 308. Non-volatile storage device 308 is a computer-readable storage medium that is capable of storing data and/or instructions. Non-volatile storage device 308 may be a variety of different types of different non-volatile storage devices. For example, non-volatile storage device 308 may be one or more hard disk drives, magnetic tape drives, CD-ROM drives, DVD-ROM drives, Blu-Ray disc drives, or other types of non-volatile storage devices.

Document management system 4 also includes an external component interface 310 that enables document management system 4 to communicate with external components. As illustrated in the example of FIG. 8, external component interface 310 communicates with an input device 312 and an external storage device 314. In one implementation of document management system 4, external component interface 310 is a Universal Serial Bus (USB) interface. In other implementations of document management system 4, document management system 4 may include another type of interface that enables document management system 4 to communicate with input device and/or output devices. For instance, document management system 4 may include a PS/2 interface. Input device 312 may be a variety of different types of devices including, but not limited to keyboards, mice, trackballs, stylus input devices, touch pads, touch-sensitive display screens, or other types of input devices. External storage device 314 may be a variety of different types of computer-readable storage media including magnetic tape, flash memory modules, magnetic disk drives, optical disc drives, and other computer-readable storage media.

In addition, document management system 4 includes a network interface 316 that enables document management system 4 to send data to and receive data from network 14. Network interface 316 may be a variety of different types of network interface. For example, network interface 316 may be an Ethernet interface, a token-ring network interface, a fiber optic network interface, a wireless network interface (e.g., WiFi, WiMax, etc.), or another type of network interface.

Document management system 4 also includes a communications medium 318 that facilitates communication among the various components of document management system 4. Communications medium 318 may comprise one or more different types of communications media including, but not limited to, a PCI bus, a PCI Express bus, an accelerated graphics port (AGP) bus, an Infiniband interconnect, a serial Advanced Technology Attachment (ATA) interconnect, a parallel ATA interconnect, a Fibre Channel interconnect, a USB bus, a Small Computer System Interface (SCSI) interface, or another type of communications medium.

Several computer-readable storage media are illustrated in the example of FIG. 8 (i.e., memory 300, non-volatile storage device 308, and external storage device 314). Together, these computer-readable storage media may constitute a single logical computer-readable storage medium. This single logical computer-readable storage medium may store instructions executable by processing unit 302. Actions described in the above description may result from the execution of the instructions stored on this single logical computer-readable storage medium. Thus, when this description says that a particular logical module performs a particular action, such a statement may be interpreted to mean that instructions of the software module cause a processing unit, such as processing unit 302, to perform the action.

The techniques of this disclosure may be realized in many ways. For example, the techniques of this disclosure may be realized as a method performed by a computing device, the method comprising determining, at the computing device, that an electronic document stored at a first repository has been declared to be an electronic record. The method also comprises, in response to determining that the electronic document has been declared to be an electronic record, determining, at the computing device, whether a record storage policy requires the electronic document to be stored at the first repository. In addition, the method comprises, in response to determining that the record storage policy requires the electronic document to be stored at the first repository, managing the electronic document as an electronic record.

In another example, the techniques of this disclosure may be realized as a computer-readable medium comprising instructions that, when executed at a computing device, cause the computing device to determine that an electronic document stored at a first repository has been declared to be an electronic record. The instructions also cause the computing device to, in response to determining that the electronic document has been declared to be an electronic record, determine whether a record storage policy requires the electronic document to be stored at the first repository. Furthermore, the instructions cause the computing device to, in response to determining that the record storage policy requires the electronic document to be stored at the first repository, manage the electronic document as an electronic record. In addition, the instructions cause the computing device to, in response to determining that the electronic document has been declared to be an electronic record, determine whether the record storage policy requires the electronic document to be stored at a second repository. The instructions also cause the computing device to, in response to determining that the record storage policy requires the electronic document to be stored at the second repository store a copy of the electronic document at the second repository and manage the copy of the electronic document stored at the second repository as an electronic record.

In another example, the techniques of this disclosure may be realized as an electronic computing device comprising a computer-readable storage medium comprising an active repository that stores an electronic document within a context. The computer-readable storage medium also comprises an administrative interface module that generates an administrative interface that enables an administrator to select, from a group of record declaration policies, a record declaration policy for the electronic document, the record declaration policy specifying a set of circumstances under which the electronic document is allowed to be declared to be an electronic record. The administrative interface also enables the administrator to select, from a group of record storage policies, a record storage policy for the electronic document that specifies how the computing device is required to store the electronic document when the electronic document is declared to be an electronic record. In addition, the administrative interface enables the administrator to select, from a group of record behavior policies, a record behavior policy for the electronic document that specifies a behavior of the electronic document after the electronic document has been declared to be an electronic record. The computer-readable storage medium also comprises a web server module that receives a first input that indicates that the administrator has selected the record declaration policy, a second input that indicates that the administrator has selected the record storage policy, and a third input that indicates that the administrator has selected the record behavior policy. In addition, the computer-readable storage medium comprises a document access interface module that generates a document access interface that displays a list of electronic documents in the context and includes icons associated with the electronic documents that visually indicate whether the electronic documents are electronic records. Furthermore, the computer-readable storage medium also comprises a policy database that stores the record declaration policy, the record storage policy, and the record behavior policy. The computer-readable storage medium also comprises a policy enforcement module that enforces the record declaration policy, the record storage policy, and the record behavior policy. The computing device also comprises a processing unit that executes instructions in the web server module, the administrative interface module, the document access interface module, the policy enforcement module, and the declaration event module. The group of record declaration policies includes a first record storage policy that requires the electronic document to remain stored at the first repository within the context, a second record storage policy for the electronic document that requires the computing device to move the electronic document to a second repository and to create a link to the electronic document in the context of the electronic document, a third record storage policy for the electronic document that requires the computing device to create a copy of the electronic document at the second repository. The group of record storage policies includes a first record storage policy that requires the electronic document to remain stored at the first repository within the context, a second record storage policy that requires the computing device to move the electronic document to the second repository and to create at the first repository a link to the electronic document in the context of the electronic document; and a third record storage policy that requires the computing device to create a copy of the electronic document at the second repository. The group of record behavior policies includes a first record behavior policy that requires the computing device to enforce a retention policy for the electronic document, and a second record behavior policy that prevents editing or deletion of the electronic document.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method performed by a computing device, the method comprising:

presenting, at the computing device, a user interface, the user interface permitting a selection of one of a group of document retention policies, each document retention policy allowing an electronic document stored at a first repository to be declared to be an electronic document that preserves the electronic document for later reference, a first selection allowing any author of the electronic document to declare that the electronic document is to be preserved for later reference, a second selection allowing only an administrator to declare that the electronic document is to be preserved for later reference, a third selection allowing the electronic document to be preserved for later reference when a particular event occurs and a fourth selection allowing the electronic document to be preserved for later reference based on a workflow, the electronic document stored at the first repository being associated with a context, the context comprising a hierarchical directory with folders, each folder including related electronic documents;

receiving a record declaration policy for the electronic document, the record declaration policy specifying a set of circumstances under which the electronic document is allowed to be declared to be an electronic record; and receiving an input specifying that the record declaration policy is applicable to a group of contexts, the group of contexts comprising a context including the hierarchical directory with folders and another context including metatdata utilized for grouping the related electronic documents, the metadata including one or more of a filename, a date that one or more of the electronic documents was last modified, a name of an author of one or more of the electronic documents and a value that indicates whether one or more of the electronic documents is a link to an electronic record;

determining, at the computing device, that the electronic document stored at the first repository has been declared to be an electronic record that preserves the electronic document for later reference;

in response to determining that the electronic document has been declared to be an electronic record, evaluating, at the computing device, a record storage policy to determine whether the record storage policy requires the electronic document to be stored as the electronic record at the first repository without making a copy of the electronic document or requires a copy of the electronic document to be stored as the electronic record at a second repository;

in response to determining that the record storage policy requires the electronic document to be stored at the first repository, managing the electronic document at the first repository as an electronic record; and in response to determining that the record storage policy requires a copy of the electronic document to be stored at the second repository:

storing a copy of the electronic document at the second repository; and managing the copy of the electronic document stored at the second repository as an electronic record.

2. The method of claim 1, further comprising:

in response to determining that the record storage policy requires the copy of the electronic document to be stored at the second repository, determining, at the computing device, whether the record storage policy requires a link to be created at the first repository to the copy of the electronic document stored at the second repository; and in response to determining that the record storage policy requires a link to be created at the first repository to the copy of the electronic document stored at the second repository, creating a link at the first repository to the copy of the electronic document stored at the second repository.

3. The method of claim 1, further comprising receiving, at the computing device, the record storage policy from an administrator.

4. The method of claim 1, wherein the method further comprises:
enforcing the record declaration policy.

5. The method of claim 4,
wherein the method further comprises receiving, at the computing device, a request from a user to declare the electronic document to be an electronic record; and
wherein enforcing the record declaration policy comprises:
in response to receiving the request, determining, at the computing device, whether the set of circumstances under which the electronic document is allowed to be declared to be an electronic record include declaring the electronic document to be an electronic record in response to a request from the user to declare the electronic document to be an electronic record;
declaring, at the computing device, the electronic document to be an electronic record when the set of circumstances under which the electronic document is allowed to be declared to be an electronic record include declaring the electronic document to be an electronic record in response to a request from the user to declare the electronic document to be an electronic record; and
not declaring, at the computing device, the electronic document to be an electronic record when the set of circumstances under which the electronic document is allowed to be declared to be an electronic record does not include declaring the electronic document to be an electronic record in response to a request from the user to declare the electronic document to be an electronic record.

6. The method of claim 4, wherein the record declaration policy specifies that an author of the electronic document is allowed to be declared to be an electronic record.

7. The method of claim 4, wherein the record declaration policy specifies that the electronic document is allowed to be automatically declared to be an electronic record when a declaration event occurs.

8. The method of claim 4, wherein the record declaration policy specifies that a workflow is allowed to automatically declare the electronic document to be an electronic record.

9. The method of claim 1, wherein the method further comprises:
receiving, at the computing device, a record behavior policy for the electronic document from an administrator, the record behavior policy for the electronic document specifying a behavior of the electronic document after the electronic document has been declared to be an electronic record; and
enforcing, at the computing device, the record behavior policy for the electronic document.

10. The method of claim 9,
wherein prior to the electronic document being declared to be an electronic record, the electronic document is subject to a first document retention policy;
wherein the record behavior policy specifies that the electronic document is subject to a second document retention policy after the electronic document is declared to be an electronic record; and
wherein enforcing the record behavior policy comprises applying, at the computing device, the second document retention policy.

11. The method of claim 9, wherein the record behavior policy specifies that a document access interface that displays a list of electronic documents in the context must include an icon associated with the electronic document that visually indicates that the electronic document is an electronic record after the electronic document is declared to be an electronic record.

12. The method of claim 1, wherein the method further comprises declaring, at the computing device, the electronic document to be an electronic record by updating a metadata value associated with the electronic document to indicate that electronic document is an electronic record.

13. A computer-readable storage medium comprising instructions that, when executed at a computing device, cause the computing device to:
present on a display device, an administrative interface, the administrative interface permitting a selection of one of a group of record declaration policies, each record declaration policy allowing an electronic document stored at a first repository to be declared to be an electronic document that preserves the electronic document for later reference, a first selection allowing any author of the electronic document to declare that the electronic document is to be preserved for later reference, a second selection allowing only an administrator to declare that the electronic document is to be preserved for later reference, a third selection allowing the electronic document to be preserved for later reference when a particular event occurs and a fourth selection allowing the electronic document to be preserved for later reference based on a workflow, the electronic document stored at the first repository being associated with a context, the context comprising a hierarchical directory with folders, each folder including related electronic documents;

receive an input specifying that the one of the group of record declaration policies is applicable to a group of contexts, the one of the group of record declaration policies specifying a set of circumstances under which the electronic document is allowed to be declared to be an electronic record, the group of contexts comprising a context including the hierarchical directory with folders and another context including metatdata utilized for grouping the related electronic documents, the metadata including one or more of a filename, a date that one or more of the electronic documents was last modified, a name of an author of one or more of the electronic documents and a value that indicates whether one or more of the electronic documents is a link to an electronic record;

determine that the electronic document stored at a first repository has been declared to be an electronic record;

in response to determining that the electronic document has been declared to be an electronic record, evaluate a record storage policy to determine whether the record storage policy requires the electronic document to be stored as the electronic record at the first repository without making a copy of the electronic document or requires a copy of the electronic document to be stored as the electronic record at a second repository;

in response to determining that the record storage policy requires the electronic document to be stored at the first repository, manage the electronic document as an electronic record; and in response to determining that the record storage policy requires a copy of the electronic document to be stored at the second repository:
store a copy of the electronic document at the second repository; and
manage the copy of the electronic document stored at the second repository as an electronic record.

14. The computer-readable storage medium of claim 13, wherein the instructions further cause the computing device to:

in response to determining that the record storage policy requires the electronic document to be stored at the second repository, determine whether the record storage policy requires a link to be created at the first repository to the copy of the electronic document stored at the second repository; and in response to determining that the record storage policy requires a link to be created at the first repository to the copy of the electronic document stored at the second repository create a link at the first repository to the copy of the electronic document stored at the second repository.

15. The computer-readable storage medium of claim 14, wherein the instructions further cause the computing device to:

enable, via the administrative interface, an administrator to specify the record storage policy for the electronic document; and receive, via the administrative interface, the record storage policy.

16. The computer-readable storage medium of claim 15, wherein the instructions further cause the computing device to present the administrative interface such that the administrative interface enables the administrator to:
specify a record behavior policy for the electronic document that specifies a behavior of the electronic document after the electronic document has been declared to be an electronic record; and wherein the instructions further cause the computing device to enforce the one of the group of record declaration policies and the record behavior policy.

17. The computer-readable storage medium of claim 13, wherein the instructions further cause the computing device to:

present, on a display device, a document access interface that presents a list of electronic documents within the first repository in the context, the list of electronic documents including the electronic document and a set of icons that visually indicate ones of the electronic documents that have been declared to be electronic records;

receive a selection of a selected document in the list of documents from a user of a client device;

in response to receiving the selection of the selected document, transmit the selected document to the client device;

receive a request to filter out electronic records from the list of documents; and in response to the request to filter out the electronic records, generate the document access interface such that the document access interface includes only those electronic documents in the list of documents that are not electronic records.

18. A computing device for management of electronics records, comprising:
a memory storage;
a processor operative to:
present, at the computing device, a user interface, the user interface permitting a selection of one of a group of document retention policies, each document retention policy allowing an electronic document stored at a first repository to be declared to be an electronic document that preserves the electronic document for later reference, a first selection allowing any author of the electronic document to declare that the electronic document is to be preserved for later reference, a second selection allowing only an administrator to declare that the electronic document is to be preserved for later reference, a third selection allowing the electronic document to be preserved for later reference when a particular event occurs and a fourth selection allowing the electronic document to be preserved for later reference based on a workflow, the electronic document stored at the first repository being associated with a context, the context comprising a hierarchical directory with folders, each folder including related electronic documents;

receive a record declaration policy for the electronic document, the record declaration policy specifying a set of circumstances under which the electronic document is allowed to be declared to be an electronic record; and receive an input specifying that the record declaration policy is applicable to a group of contexts, the group of contexts comprising a context including the hierarchical directory with folders and another context including metatdata utilized for grouping the related electronic documents, the metadata including one or more of a filename, a date that one or more of the electronic documents was last modified, a name of an author of one or more of the electronic documents and a value that indicates whether one or more of the electronic documents is a link to an electronic record;

determine, at the computing device, that the electronic document stored at the first repository has been declared to be an electronic record that preserves the electronic document for later reference;

in response to determining that the electronic document has been declared to be an electronic record, evaluating, at the computing device, a record storage policy to determine whether the record storage policy requires the electronic document to be stored as the electronic record at the first repository without making a copy of the electronic document or requires a copy of the electronic document to be stored as the electronic record at a second repository;

in response to determining that the record storage policy requires the electronic document to be stored at the first repository, manage the electronic document at the first repository as an electronic record; and in response to determining that the record storage policy requires a copy of the electronic document to be stored at the second repository:
storing a copy of the electronic document at the second repository; and
managing the copy of the electronic document stored at the second repository as an electronic record.

* * * * *